US008773414B2

(12) United States Patent
Lin et al.

(10) Patent No.: US 8,773,414 B2
(45) Date of Patent: Jul. 8, 2014

(54) DRIVING CIRCUIT OF LIGHT EMITTING DIODE AND GHOST PHENOMENON ELIMINATION CIRCUIT THEREOF

(75) Inventors: Chun-Fu Lin, Hsinchu (TW); Chun-Ting Kuo, Pingtung County (TW); Cheng-Han Hsieh, Hsinchu County (TW)

(73) Assignee: My-Semi Inc., Hsinchu County (TW)

( * ) Notice: Subject to any disclaimer, the term of this patent is extended or adjusted under 35 U.S.C. 154(b) by 223 days.

(21) Appl. No.: 13/555,046

(22) Filed: Jul. 20, 2012

(65) Prior Publication Data

US 2013/0093358 A1 Apr. 18, 2013

(30) Foreign Application Priority Data

Oct. 12, 2011 (TW) ............................ 100136899 A

(51) Int. Cl.
*G06F 3/038* (2013.01)

(52) U.S. Cl.
USPC ................................ 345/204; 345/89; 345/98

(58) Field of Classification Search
USPC ........................ 345/76–83, 90–100, 204–215
See application file for complete search history.

(56) References Cited

U.S. PATENT DOCUMENTS

| | | | | |
|---|---|---|---|---|
| 7,551,157 | B2 * | 6/2009 | Tanaka et al. | 345/98 |
| 8,169,432 | B2 * | 5/2012 | Yamamoto et al. | 345/214 |
| 2002/0158855 | A1 * | 10/2002 | Matsueda | 345/204 |
| 2011/0134166 | A1 * | 6/2011 | Shirasaki et al. | 345/690 |

* cited by examiner

*Primary Examiner* — Tung X Le
(74) *Attorney, Agent, or Firm* — Li & Cai Intellectual Property (USA) Office

(57) ABSTRACT

A driving circuit of a light emitting diode (LED) and a ghost phenomenon elimination circuit thereof are disclosed. The ghost phenomenon elimination circuit which includes a ghost phenomenon elimination unit and a counter unit may determine a black insertion period according to a gray scale clock signal, and output an enable signal to the ghost phenomenon elimination unit during the black insertion period. The ghost phenomenon elimination unit may pull up the voltage levels at current driving terminals of the driving circuit so as to prevent the ghost phenomenon from occurring.

16 Claims, 6 Drawing Sheets

DRIVING CIRCUIT OF LIGHT EMITTING DIODE AND GHOST PHENOMENON ELIMINATION CIRCUIT THEREOF

BACKGROUND OF THE INVENTION

1. Field of the Invention

The present invention relates to a driving circuit of a light emitting diode; in particular, to a driving circuit having the function of eliminating ghost phenomenon.

2. Description of Related Art

Light emitting diodes (LEDs) are small, power saving, and durable components. Along with the maturity of the manufacturing processes and cost reducing, more and more products are using light emitting diode as a light source. The light emitting diode is used in several kinds of equipments, such as headlight lamp of a vehicle, traffic light, word displayer, signboard, large screen video display, simple and building illumination, and LCD backlight.

Please refer to FIG. 1. FIG. 1 shows a schematic diagram of a conventional driving device of a light emitting diode. The driving device of the light emitting diode mainly includes a driving line selector 110 and a driving circuit 120. The driving line selector 110 may select the conducted driving lines L1 and L2. Every driving line L1 or L2 is connected with several respective light emitting diodes D1~D4, as shown in FIG. 1. The driving circuit 120 is for controlling driving currents of the light emitting diodes D1~D4, and has several current driving terminals OUT1 and OUT2 which correspond to different light emitting diodes D1~D4. In detail, the driving circuit 120 has a current source circuit for controlling the currents flowing into the current driving terminals OUT1 and OUT2, in order to control the brightness of the light emitting diodes D1~D4.

In the multi scanning driving structure, such as two scanning or four scanning, the driving line selector 110 must scan several sets of light emitting diodes in one single frame period. When the scanning processes are switching, a ghost phenomenon may occur because of the parasitic capacitance of the light emitting diodes, and the phenomenon may get worse due to the increase of the switch actions.

SUMMARY OF THE INVENTION

The object of the present invention is to provide a driving circuit of a light emitting diode (LED) and a ghost phenomenon elimination circuit thereof. The driving circuit may pull up the voltage level of a current driving terminal to a high voltage level during a black insertion period, in order to reduce the problem of ghost phenomenon of the light emitting diode.

In order to achieve the aforementioned objects, according to an embodiment of the present invention, a driving circuit of the light emitting diode is disclosed. The driving circuit includes a current driving unit and a ghost phenomenon elimination circuit. The current driving unit has at least one current driving terminal, and the ghost phenomenon elimination circuit includes a ghost phenomenon elimination unit and a counter unit. The ghost phenomenon elimination unit is coupled to the current driving terminal, for adjusting the voltage level of the current driving terminal according to an enable signal. The counter unit is coupled to the ghost phenomenon elimination unit, for counting a gray scale clock signal, in order to determine a black insertion period and output the enable signal to the ghost phenomenon elimination unit during the black insertion period. After that, the ghost phenomenon elimination unit may pull up the voltage level of the current driving terminal to a high voltage level according to the enable signal.

Seeing from another aspect, the present invention provides a ghost phenomenon elimination circuit which is associated with a driving circuit of a light emitting diode. A current driving unit of the driving circuit has at least one current driving terminal, and an output timing of the current driving terminal corresponds to a gray scale clock signal. The ghost phenomenon elimination circuit includes a ghost phenomenon elimination unit and a counter unit. The ghost phenomenon elimination unit is coupled to the current driving terminal, for adjusting the voltage level of the current driving terminal according to an enable signal. The counter unit is coupled to the ghost phenomenon elimination unit for counting a gray scale clock signal, in order to determine a black insertion period and output the enable signal to the ghost phenomenon elimination unit during the black insertion period. After that, the ghost phenomenon elimination unit may pull up the voltage level of the current driving terminal to a high voltage level according to the enable signal.

On the basis of the above, the present invention determines the black insertion period by counting the gray scale clock signal, and pulls up the voltage of the current driving terminal during the black insertion period, for speeding up the time of turning off the light emitting diode, in order to eliminate the problem of ghost phenomenon.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings. Moreover, the same numerical expressions may represent similar components.

The First Embodiment

Figure 1:
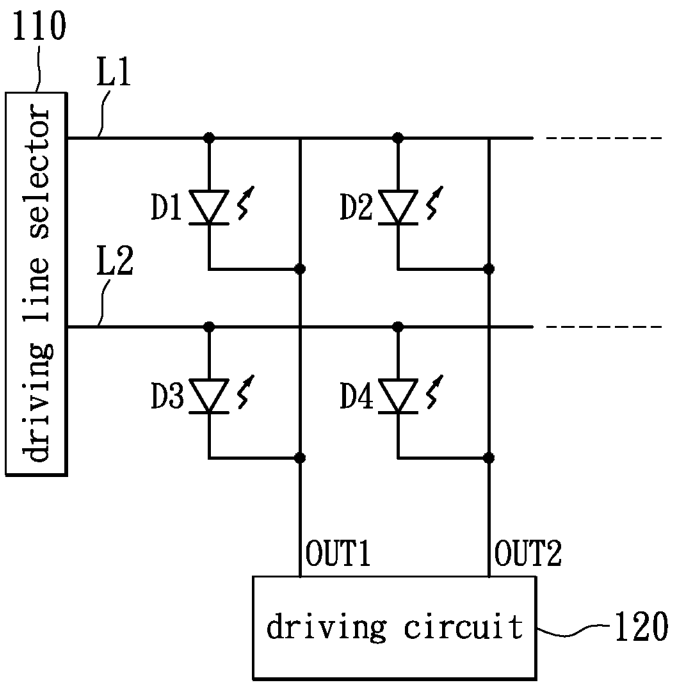
FIG. 1 shows a schematic diagram of a conventional driving circuit of a light emitting diode.
Figure 2:
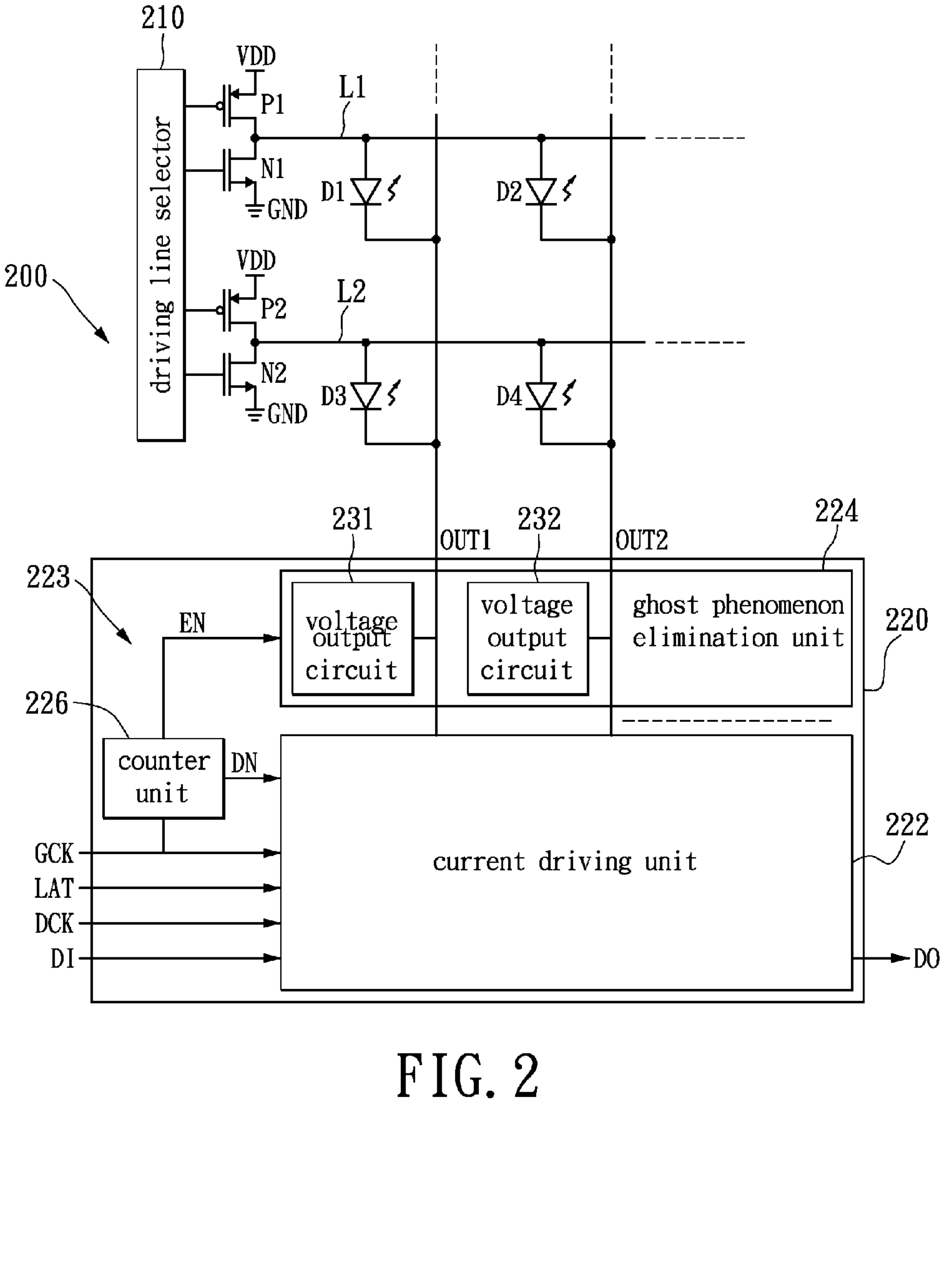
FIG. 2 shows a schematic diagram of a driving circuit of a light emitting diode according to a first embodiment of the present invention.

Please refer to FIG. 2. FIG. 2 shows a schematic diagram of a driving device of a light emitting diode (LED) according to a first embodiment of the present invention. The driving device 200 includes a driving line selector 210 and a driving circuit 220. The driving line selector 210 is used for scanning driving lines L1 and L2 which are connected with respective several light emitting diodes D1~D4. The driving line selector 210 may connect to the driving line L1 through a PMOS transistor P1 and an NMOS transistor N1. The PMOS transistor P1 is connected between a driving voltage VDD and the driving line L1, and the NMOS transistor N1 is connected between a ground terminal GND and the driving line L1. The driving line selector 210 may determine whether to provide the driving voltage VDD to the driving line L1 or not by controlling the PMOS transistor P1 and the NMOS transistor N1, for driving the corresponding light emitting diodes D1, D2.

The driving line selector 210 may connect to driving line L2 through a PMOS transistor P2 and an NMOS transistor N2, and the circuit structure thereof is similar to the aforementioned circuits, thus it is not described repeatedly. The circuit structure of the driving line selector 210 may be adjusted for matching different scanning manners, such as two scanning or four scanning. The two scanning or four scanning manners mean that a single current driving terminal OUT1 drives two sets (or arrays) or four sets (or arrays) of light emitting diodes in one frame period.

The driving circuit 220 includes a current driving unit 222 and a ghost phenomenon elimination circuit 223. The ghost phenomenon elimination circuit 223 includes a counter unit 226 and a ghost phenomenon elimination unit 224. Moreover, the ghost phenomenon elimination unit 224 has several voltage output circuits 231 and 232 which are coupled to several current driving terminals OUT1 and OUT2 of the current driving unit 222 respectively, in order to adjust the voltage levels of the current driving terminals OUT1 and OUT2. The counter unit 226 is coupled to the ghost phenomenon elimination unit 224 and the current driving unit 222, for determining a black insertion period of the screen according to a gray scale clock signal GCK, and for outputting an enable signal EN to the ghost phenomenon elimination unit 224 during the black insertion period. The voltage output circuits 231 and 232 may pull up the voltage levels of the current driving terminals OUT1 and OUT2 to a high voltage level during the black insertion period according to the enable signal EN. The gray scale clock signal GCK is a clock signal which is frequently used in a driving circuit of light emitting diodes, and is mainly used for determining frame periods and calculating pulse density modulation signals. However, the present embodiment is not limited thereby.

Generally, the driving circuit 220 may determine output timings of the current driving terminals OUT1 and OUT2 according to the gray scale clock signal GCK. By selectively adjusting the output timings of the current driving terminals OUT1 and OUT2, the driving circuit 220 may adjust the average brightness of the light emitting diodes D1~D4.

During the black insertion period, the driving circuit 220 may reduce the currents of the current driving terminals OUT1 and OUT2 to zero, that is, turns off the light emitting diodes D1~D4 for inserting black screens. The insertion of black screens may reduce the ghost phenomenon of the screen. Therefore, during the black insertion period, the current driving unit 222 may be disabled for stopping driving the light emitting diodes D1~D4. The current driving unit 222 may be disabled according to a disable signal DN outputted by the counter unit 226, or according to the controls of outer signals, only if the timings are synchronous to the black insertion period. The present embodiment does not restrict the control manners of the driving circuit 220.

In addition, the current driving unit 222 may be disabled during the black insertion period according to the changes of the voltage level of the enable signal EN. It is worth noting that the disabling of the current driving unit 222 only represents turning off the current driving terminals OUT1 and OUT2 rather than restricting whether the circuit of the current driving unit 222 stops operating or not. The manners of turning off the current driving terminals OUT1 and OUT2 may be using a switch for cutting off its current paths, however, the present embodiment is not limited thereby.

In other words, when the counter unit 226 detects the signal of inserting black screens, it may simultaneously enable the ghost phenomenon elimination unit 224 and disable the current driving unit 222, for allowing the ghost phenomenon elimination unit 224 to pull up the voltages of the current driving terminals OUT1 and OUT2 to a high voltage level, and to reduce the current values passing through the current driving terminals OUT1 and OUT2. Therefore, the ghost phenomenon of the light emitting diodes D1~D4 may be reduced. The mentioned high voltage level may be designed according to actual needs, thus the present embodiment is not restricted thereby. The counter unit 226 may use the number or waveform of the gray scale clock signal GCK for determining the black insertion period. For example, one black insertion period may be generated every 1024 or 2048 pulses, or a specific pulse waveform may be used for generating the black insertion period, wherein the detection manner thereof is not limited in the present embodiment. In addition, the black insertion period may also be generated according to actual design requirements, and it is not restricted in this embodiment.

Figure 3:
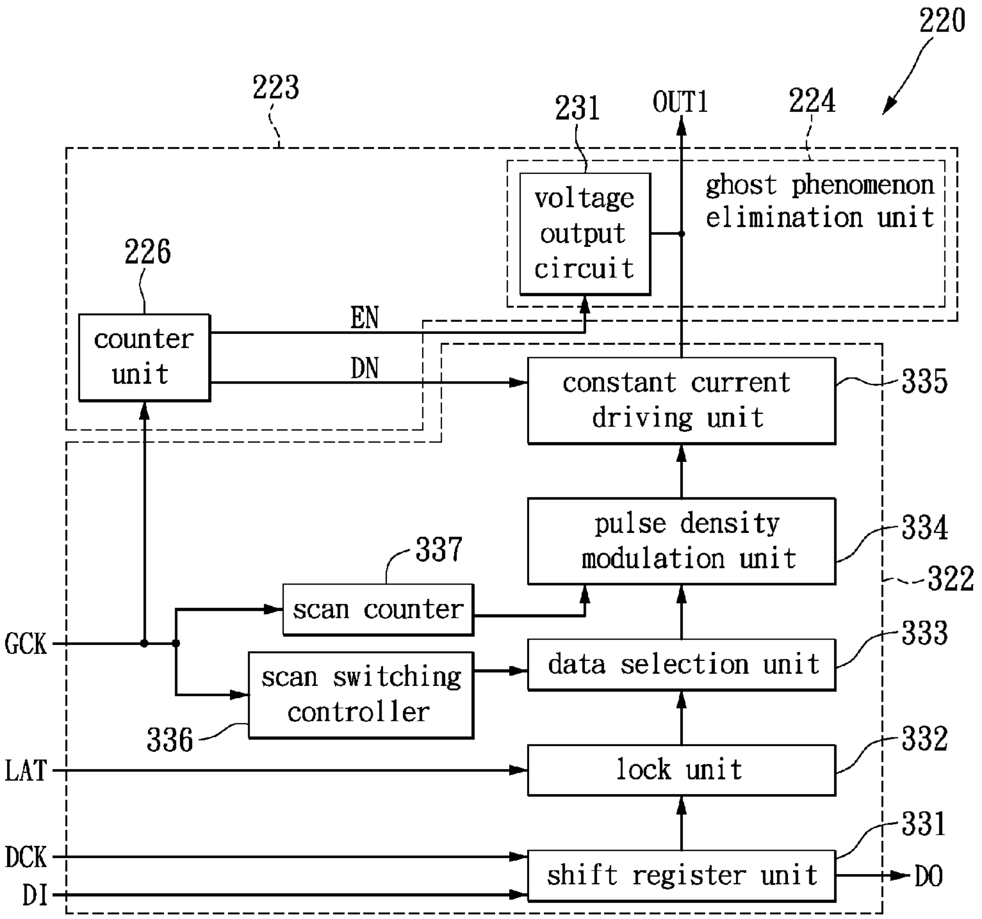
FIG. 3 shows a schematic diagram of a partial circuit of a current driving unit 222 according to the first embodiment of the present invention.

The current driving unit 222 of the driving circuit 220 may include several channel circuits 322 or several circuits which are able to generate a plurality of current sources, which may be used for determining the current amounts flowing through the light emitting diodes D1~D4 when they turn on. Please refer to FIGS. 2 and 3 at the same time. FIG. 3 shows a schematic diagram of a partial circuit of the current driving unit 222 according to the first embodiment of the present invention. The channel circuit 322 is applicable for controlling the driving current and the driving timing of the current driving terminal OUT1. The channel circuit 322 includes a shift resister unit 331, a lock unit 332, a data selection unit 333, a pulse density modulation unit 334, a constant current driving unit 335, a scan switching controller 336, and a scan counter 337. The lock unit 332 is coupled to the shift register unit 331 and the data selection unit 333, the pulse density modulation unit 334 is coupled to the data selection unit 333 and the constant current driving unit 335, and the voltage output circuit 231 of the ghost phenomenon elimination unit 224 is coupled to the current driving terminal OUT1. The scan switching controller 336 is coupled to the data selection unit 333, and the scan counter 337 is coupled to the pulse density modulation unit 334 for counting the gray scale clock signal, in order to output a counting signal to the pulse density modulation unit 334.

The shift register unit 331 may store the pixel data according to a data clock signal DCK and a data signal DI, and may transmit the data signal DI to the next channel circuit. The data signals outputted by the shift register unit 331 are represented by the symbol DO. The lock unit 332 locks the data stored in the shift register unit 331 according to a lock signal LAT. The date selection unit 333 may choose the corresponding gray scale data to the pulse density modulation unit 334 according to the driving timing. For example, if the structure of the light emitting diode display is two scanning, that means two sets of light emitting diodes are scanned within one frame period, and the data selection unit 333 thereof may have two sets of gray data. The scan switching controller 336 may acquire the currently scanned pixels (light emitting diodes) according to the gray scale clock signal GCK, and then controls the data selection unit 333 for selecting corresponding gray scale data.

The scan counter 337 is used for counting the gray scale clock signal GCK, and outputting the result thereof to the pulse density modulation unit 334. The pulse density modulation unit 334 may serve as a comparison unit, for comparing the counting result with the gray scale data, in order to generate a pulse density modulation signal to the current driving unit 335. According to that, the constant current driving unit 335 may drive a constant current source circuit, which allows the constant current source circuit to conduct for a corresponding time length during one frame period. The driving manners may be a pulse width modulation signal, but the duty cycle thereof is separated into several small periods which are averagely distributed in the whole frame period. The driving manner may reduce the ghost phenomenon and increase screen qualities.

It is worth noting that the counter unit 226, the scan counter 337 and the scan switching controller 336 generate outputs according to the gray scale clock signal GCK, thus they may be integrated in one signal counter circuit or be implemented by different counter circuit, which are not limited in the present embodiment. The counter unit 226 directly accords to the gray scale clock signal GCK for enabling the ghost phenomenon elimination unit 224 and disabling the constant current driving unit 335. Generally, the driving chip of the light emitting diodes has the pin for receiving the gray scale clock signal GCK, thus the ghost phenomenon elimination circuit 223 according to the present invention may be directly integrated into conventional driving chip of the light emitting diodes without setting extra pins or control signals for controlling it. In addition, the current driving unit 222 may use different circuits for matching different design requirements, and the circuit structure thereof is not limited by FIG. 3.

Figure 4:
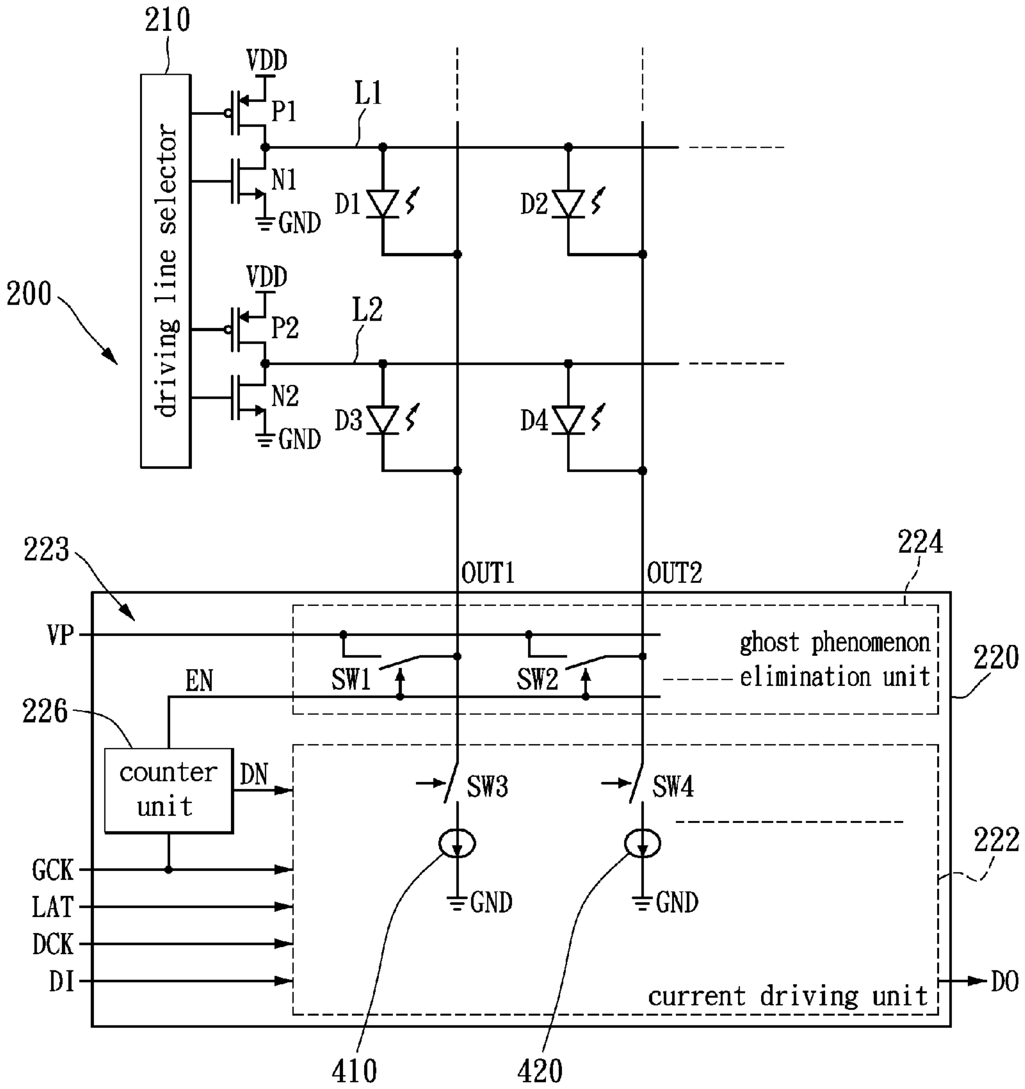
FIG. 4 shows a schematic diagram of a driving circuit according to the first embodiment of the present invention.

The voltage output circuits 231 and 232 may be implemented by switch components, and the disabling function of the current driving unit 222 may also be implemented by the switch components. Please refer to FIG. 4. FIG. 4 shows a schematic diagram of the driving circuit according to the first embodiment of the present invention. The ghost phenomenon elimination unit 224 has switches SW1 and SW2 for implementing the functions of the voltage output circuits 231 and 232 in FIG. 2. The switch SW1 is coupled between a high voltage VP and the current driving terminal OUT1, and is controlled be the enable signal EN. The switch SW2 is coupled between the high voltage VP and the current driving terminal OUT2, and is controlled by the enable signal EN. The current driving unit 222 includes switches SW3 and SW4 which are respectively coupled between a current source 410 and the current driving terminal OUT1, and between a current source 420 and the current driving terminal OUT2. The current driving functions of the current driving unit 222 are implemented by using the current sources 410 and 420. However, the circuit structure is not limited thereby.

When the counter unit 226 detects a black insertion period, it may output an enable signal EN for turning on the switches SW1 and SW2, and output a disable signal DN for turning off the switches SW3 and SW4, in order to insert black screen and reducing ghost phenomenon. When the counter unit 226 does not detect the black insertion period, it may turning off the switched SW1 and SW2, and turning on the switches SW3 and SW4, for normally driving the light emitting diodes D1~D4. When the switches SW1 and SW2 are turning on, the high voltage VP may be outputted to the current driving terminals OUT1 and OUT2, for raising the voltages of the cathodes of light emitting diodes D1~D4 to high voltage levels, in order to turn off the light emitting diodes D1~D4 and to reduce the generation of the ghost phenomenon.

The current driving unit 222 may have several current driving terminals, and the ghost phenomenon elimination unit 224 may have several voltage output circuits which correspond to the current driving terminals. The numbers of the current driving terminal and the voltage output circuit are not restricted by this embodiment. By the aforementioned descriptions of embodiments, the person skilled in the art may easily derive the implementation manner, and the present embodiment may not repeat them again.

In addition, the switches SW1 and SW2 may be implemented by transistors, such as a PMOS transistor and an NMOS transistor, and the present embodiment is not limited thereby. The NMOS transistor is an abbreviation of N channel metal oxide semiconductor field effect transistor, and the PMOS is an abbreviation of P channel metal oxide semiconductor field effect transistor.

The Second Embodiment

Figure 5:
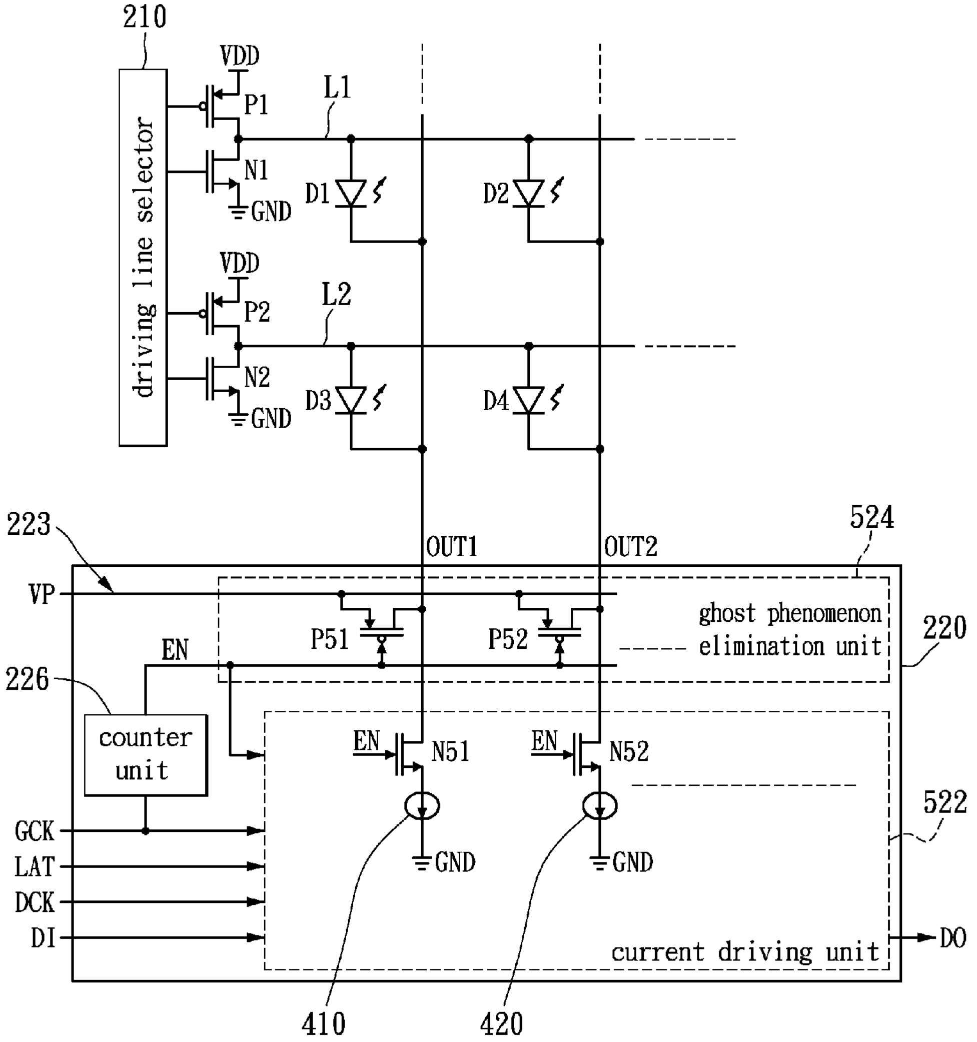
FIG. 5 shows a schematic diagram of a driving circuit of a light emitting diode according to a second embodiment of the present invention.

Please refer to FIG. 5. FIG. 5 shows a schematic diagram of a driving circuit of a light emitting diode according to a second embodiment of the present invention. The differences between FIGS. 5 and 4 are PMOS transistors P51, P52 of the ghost phenomenon elimination unit 524, and NMOS transistors N51, N52 of the current driving unit 522. The PMOS transistor P51 is coupled between the current driving terminal OUT1 and the high voltage VP, and the PMOS transistor P52 is coupled between the current driving terminal OUT2 and the high voltage VP. The gates of the PMOS transistors P51 and P52 are coupled to the counter unit 226. The NMOS transistor N51 is coupled to the current path of the current driving terminal OUT1, and the NMOS transistor N52 is coupled to the current path of the current driving terminal OUT2. The gates of the NMOS transistors N51 and N52 are coupled to the counter unit 226. During the black insertion period, the enable signal EN outputted by the counter unit 226 is low voltage, which may turn on the PMOS transistors P51 and P52 and turn off the NMOS transistors N51 and N52. On the other hand, during the normal operation processes, the enable signal EN outputted by the counter unit 226 is high voltage, which may turn off the PMOS transistors P51 and P52 and turn on the NMOS transistors N51 and N52.

In another embodiment of the present invention, the voltage output circuits 231 and 232 may be implemented by NMOS transistors, and the current driving terminals OUT1 and OUT2 may be implemented by PMOS transistors. At this time, the counter unit 226 may output high voltage enable signal EN during the black insertion period, and output low voltage enable signal EN during normal operation processes. After aforementioned descriptions, the person skilled in the art may derive other implementation manners, thus they are not described redundantly.

The Third Embodiment

Figure 6:
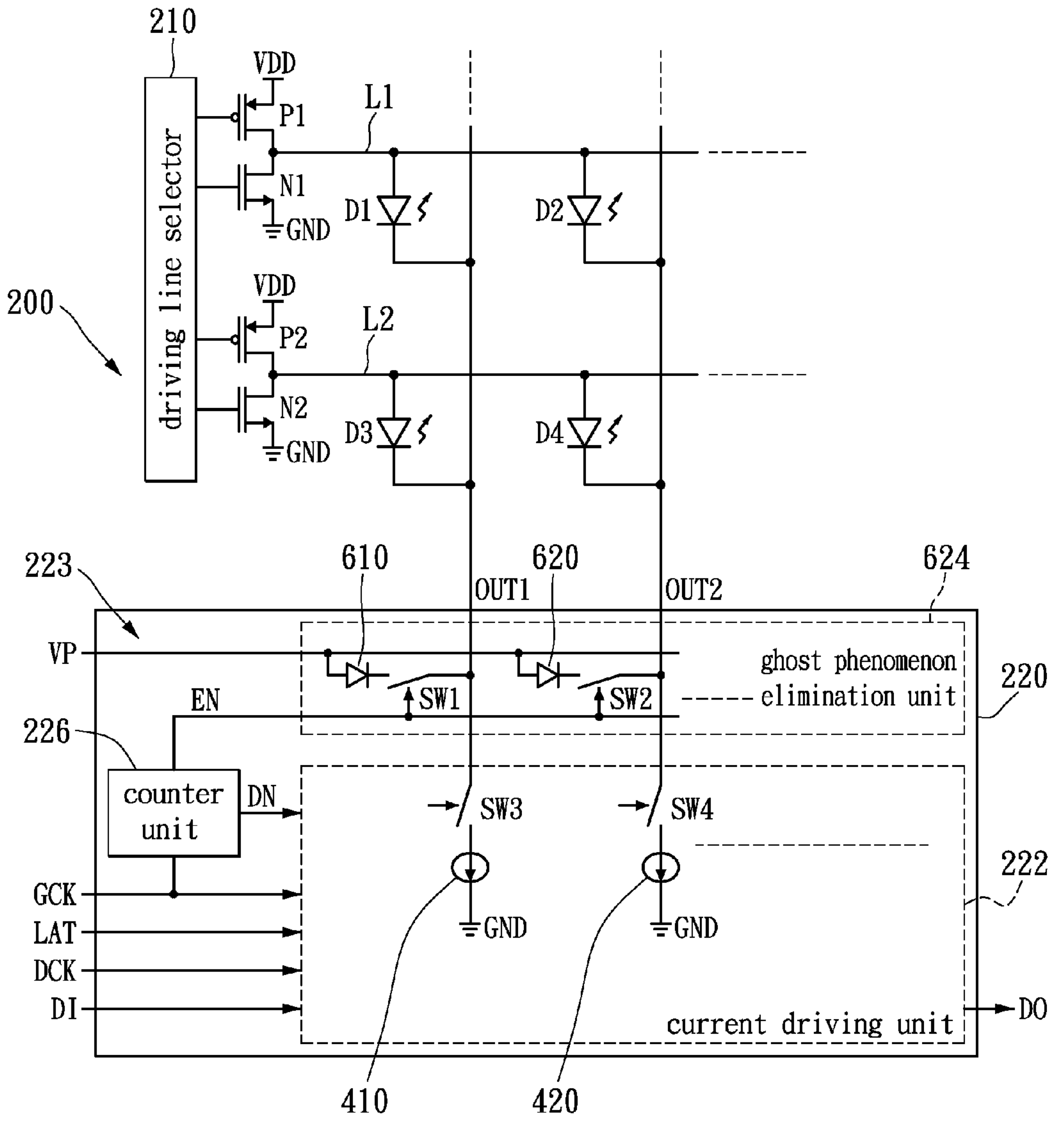
FIG. 6 shows a schematic diagram of a driving circuit of a light emitting diode according to a third embodiment of the present invention.

Please refer to FIG. 6. FIG. 6 shows a schematic diagram of a driving circuit of a light emitting diode according to a third embodiment of the present invention. The differences between FIGS. 6 and 4 are that the ghost phenomenon elimination unit 624 includes the switches SW1 and SW2 and diodes 610 and 620 which may be used for implementing the functions of the voltage output circuits 231 and 232 in FIG. 2.

The switch SW1 is coupled between the cathode of the diode 610 and the current driving terminal OUT1, and the anode of the diode 610 is coupled to the high voltage VP. The switch SW2 is coupled between the cathode of the diode 620 and the current driving terminal OUT2, and the anode of the diode 620 is coupled to the high voltage VP. The switches SW1, SW2 have control terminals coupled to the enable signal respectively. The switch SW1 and the diode 610 are one of the implementations of the voltage output circuit 231, and the switch SW2 and the diode 620 are one of the implementation of the voltage output circuit 232. However, the implementations of the voltage output circuits 231 and 232 are not limited by FIG. 6.

The high voltage may be generated by outer circuits or inner voltage output circuits which its switches SW1 and SW2 are coupled to the power source lines for receiving the high voltage VP through the diodes 610, 620. The diodes 610 and 620 are respectively coupled between the switch SW1, SW2 and the power source lines, which have the capability of preventing current from flowing back to the power source lines for receiving high voltage VP through the current driving terminals OUT1 and OUT2. When the voltages of the current driving terminals OUT1 and OUT2 are larger than the high voltage VP, the diodes 610 and 620 may prevent the voltages of the current driving terminals from being transmitted to the circuits for generating the high voltage VP, which may avoid influencing or damaging the circuits for generating the high voltage VP.

The operation manners of the switches SW1 and SW2 are as shown in the descriptions of FIG. 4. After the aforementioned descriptions, the one skilled in the art may derive their implementation manners, thus they are not described redundantly.

In addition, it is worth noting that the coupling relations between the components described above may include direct or indirect electrical connections, only if the connections are able to do the requisite signal transmissions, and they are not limited in the present invention. The technical means described in the aforementioned embodiments may be used independently or dependently, and the components thereof may be increased, eliminated, adjusted, or replaced according to the function and design requirements, which are not limited in this invention. After the aforementioned descriptions, the one skilled in the art may derive their implementation manners, thus they are not described redundantly.

On the basis of the above, the ghost phenomenon elimination circuit may generate high voltage to the current driving terminals during the black insertion period according to the gray scale clock signal, which may achieve the objection of eliminating the ghost phenomenon.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims

What is claimed is:

1. A driving circuit of a light emitting diode, comprising:

a current driving unit having at least one current driving terminal; and a ghost phenomenon elimination circuit including:

a ghost phenomenon elimination unit coupled to the current driving terminal, for adjusting a voltage level of the current driving terminal according to an enable signal; and a counter unit coupled to the ghost phenomenon elimination unit, for counting a gray scale clock signal to determine a black insertion period and output the enable signal to the ghost phenomenon elimination unit during the black insertion period;

wherein the ghost phenomenon elimination unit pulls up the voltage level of the current driving terminal to a high voltage level according to the enable signal.

2. The driving circuit of the light emitting diode according to claim 1, wherein the counter unit is further coupled to the current driving unit, for outputting the enable signal to the current driving unit to disable the current driving unit during the black insertion period.

3. The driving circuit of the light emitting diode according to claim 1, wherein the current driving unit includes:

a shift register unit;

a lock unit coupled to the shift register unit;

a data selection unit coupled to the lock unit;

a pulse density modulation unit coupled to the data selection unit;

a constant current driving unit coupled to the pulse density modulation unit;

a scan switching controller coupled to the data selection unit, for selecting a scan data; and a scan counter coupled to the pulse density modulation unit, for counting the gray scale clock signal, in order to output a counting signal to the pulse density modulation unit.

4. The driving circuit of the light emitting diode according to claim 1, wherein the ghost phenomenon elimination unit includes at least one voltage output circuit which is coupled to the respective current driving terminal, and is controlled by the enable signal, wherein when the voltage output circuit receives the enable signal, a high voltage is outputted to the respective current driving terminal.

5. The driving circuit of the light emitting diode according to claim 4, wherein each voltage output circuit includes:

a switch having a first terminal, a second terminal, and a control terminal, wherein the first terminal is coupled to the high voltage, the second terminal is coupled to one of the current driving terminals correspondingly, and the control terminal is coupled to the enable signal.

6. The driving circuit of the light emitting diode according to claim 5, wherein the switch is an NMOS transistor or a PMOS transistor.

7. The driving circuit of the light emitting diode according to claim 4, wherein each voltage output circuit includes:

a switch having a first terminal coupled to the current driving terminal correspondingly and a control terminal coupled to the enable signal; and a diode having an cathode coupled to a second terminal of the switch and a anode coupled the high voltage.

8. The driving circuit of the light emitting diode according to claim 1, wherein the current driving unit has at least one switch coupled to a current path of the respective current driving terminal, and when the ghost phenomenon elimination unit pulls up the voltage level of the current driving terminal to the high voltage level, the switch is turned off.

9. A ghost phenomenon elimination circuit adaptable for a driving circuit of a light emitting diode, wherein a current driving unit of the driving circuit has at least one current driving terminal, and the current driving terminal has an output timing corresponding to a gray scale clock signal, comprising:

a ghost phenomenon elimination unit coupled to the current driving terminal, for adjusting a voltage level of the current driving terminal according to an enable signal; and a counter unit coupled to the ghost phenomenon elimination unit, for counting the gray scale clock signal to determine a black insertion period and output the enable signal to the ghost phenomenon elimination unit during the black insertion period;

wherein the ghost phenomenon elimination unit pulls up the voltage level of the current driving terminal to a high voltage level according to the enable signal.

10. The ghost phenomenon elimination circuit according to claim 9, wherein the ghost phenomenon elimination unit is further coupled to the current driving unit, for outputting the enable signal to the current driving unit to disable the current driving unit during the black insertion period.

11. The ghost phenomenon elimination circuit according to claim 9, wherein the current driving unit includes:

a shift register unit;

a lock unit coupled to the shift register unit;

a data selection unit coupled to the lock unit;

a pulse density modulation unit coupled to the data selection unit;

a constant current driving unit coupled to the pulse density modulation unit;

a scan switching controller coupled to the data selection unit, for selecting a scan data; and a scan counter coupled to the pulse density modulation unit, for counting the gray scale clock signal to output a counting signal to the pulse density modulation unit.

12. The ghost phenomenon elimination circuit according to claim 9, wherein the ghost phenomenon elimination unit includes at least one voltage output circuit coupled to the respective current driving terminal and controlled by the enable signal, wherein when the voltage output circuit receives the enable signal, a high voltage is outputted to the respective current driving terminal.

13. The ghost phenomenon elimination circuit according to claim 12, wherein each voltage output circuit includes:

a switch having a first terminal coupled to the high voltage, a second terminal coupled to the current driving terminal correspondingly, and a control terminal coupled to the enable signal.

14. The ghost phenomenon elimination circuit according to claim 13, wherein the switch is an NMOS transistor or a PMOS transistor.

15. The ghost phenomenon elimination circuit according to claim 12, wherein each voltage output circuit includes:

a switch having a first terminal coupled to the current driving terminal correspondingly, and a control terminal coupled to the enable signal; and a diode which has an cathode coupled to a second terminal of the switch and a anode coupled to the high voltage.

16. The ghost phenomenon elimination circuit according to claim 9, wherein the current driving unit has at least one switch coupled to a current path of the respective current driving terminal, and when the ghost phenomenon elimination unit pulls up the voltage level of the current driving terminal to the high voltage level, the switch is turned off.

* * * * *